(12) United States Patent
Nitta et al.

(10) Patent No.: US 6,757,484 B2
(45) Date of Patent: Jun. 29, 2004

(54) DATA RECORDING/REPRODUCING DEVICE

(75) Inventors: Hajime Nitta, Kanagawa (JP);
 Toshimichi Hamada, Tokyo (JP);
 Masashi Ohta, Tokyo (JP); Kiyoshi Ota, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/812,167

(22) Filed: Mar. 19, 2001

(65) Prior Publication Data

US 2002/0051628 A1 May 2, 2002

(30) Foreign Application Priority Data

Mar. 17, 2000 (JP) ..................................... P2000-081857

(51) Int. Cl.⁷ ............................................... H04N 5/91
(52) U.S. Cl. ............................. 386/98; 386/68; 386/70; 386/104
(58) Field of Search .......................... 386/98, 104, 68, 386/70

(56) References Cited

U.S. PATENT DOCUMENTS

| | | | | |
|---|---|---|---|---|
| 4,301,466 A | * | 11/1981 | Lemoine et al. | ............ 348/539 |
| 4,460,926 A | * | 7/1984 | Nakamuta | ..................... 386/18 |
| 4,636,858 A | * | 1/1987 | Hague et al. | ............... 348/463 |
| 5,093,750 A | * | 3/1992 | Park et al. | ..................... 386/98 |
| 5,208,678 A | * | 5/1993 | Nakagawa | ................. 386/104 |
| 5,229,855 A | * | 7/1993 | Siann | .......................... 348/588 |
| 5,327,156 A | * | 7/1994 | Masukane et al. | .......... 345/634 |
| 5,386,323 A | * | 1/1995 | Ishiwata et al. | ............ 386/104 |
| 5,432,649 A | * | 7/1995 | Yamada et al. | ................ 386/93 |
| 5,543,934 A | * | 8/1996 | Takeuchi et al. | ............ 386/104 |
| 5,592,236 A | * | 1/1997 | Rosenbaum et al. | ........ 348/586 |
| 5,701,383 A | * | 12/1997 | Russo et al. | ................... 386/46 |
| 5,712,948 A | * | 1/1998 | Yamada et al. | ................ 386/95 |
| 5,740,388 A | * | 4/1998 | Hunt | .......................... 345/723 |
| 5,974,220 A | * | 10/1999 | Kajimoto | ...................... 386/52 |
| 6,018,612 A | * | 1/2000 | Thomason et al. | ........... 386/82 |
| 6,094,522 A | * | 7/2000 | Ito et al. | ........................ 386/52 |
| 6,397,000 B1 | * | 5/2002 | Hatanaka et al. | ............. 386/52 |
| 6,421,496 B1 | * | 7/2002 | Sato | ....................... 348/207.99 |

* cited by examiner

*Primary Examiner*—Vincent Boccio
*Assistant Examiner*—James A Fletcher
(74) *Attorney, Agent, or Firm*—Lerner, David, Littenberg, Krumholz & Mentlik, LLP

(57) ABSTRACT

A system for recording an input video signal input to an A/D conversion processing section on a recording medium in accordance with a recording clock generated by a recording system synchronous control section, and for outputting the video signal recorded on the recording medium to outside in accordance with a reproducing system synchronous control section. When switching and outputting a recording video signal input to the A/D conversion processing section and a reproduction video signal recorded on the recording medium and then decoded and output by an MPEG AV decoder, the recording video signal is temporarily stored in a frame synchronizer, and the recording video signal stored in the frame synchronizer and the reproduction video signal decoded by the MPEG AV decoder are switched and output in accordance with a reproduction clock generated by the reproducing system synchronous control section.

15 Claims, 4 Drawing Sheets

DATA RECORDING/REPRODUCING DEVICE

CROSS-REFERENCE TO RELATED APPLICATIONS

This application claims priority of Japanese Application No. P2000-081857 filed Mar. 17, 2000, the disclosure of which is hereby incorporated by reference herein.

BACKGROUND OF THE INVENTION

This invention relates to a data recording/reproducing device for recording data and reproducing the recorded data.

Conventionally, in a recording/reproducing device having a tape-like recording medium such as a VTR (video tape recorder), it is often the case that a synchronizing signal to be used is switched between recording and reproduction. That is, in the conventional recording/reproducing device, it is often the case that, at the time of recording, a synchronizing signal is generated from an input video signal so as to carry out the recording operation in accordance with the synchronizing signal, whereas, at the time of reproduction, a reference signal is generated by a built-in crystal oscillator so as to carry out the reproducing operation in accordance with the reference signal.

On the other hand, in a recording/reproducing device having a disc-shaped recording medium, the recording operation and the reproducing operation are often carried out at the same time. Therefore, in such devices, unlike the devices having a tape-like recording medium, either the synchronous system processing sections for generating the synchronizing signal and the reference signal must operate independently for recording and for reproduction, or the reproducing operation must be synchronized with the recording operation.

As described above, in recording/reproducing devices having a disc-shaped recording medium, where different synchronous system processing sections are used for recording and for reproduction, thus making the synchronous systems operate asynchronously, an image to be displayed is interrupted and becomes discontinuous when shifting from the display of an image being recorded to the display of an image being reproduced, and it is difficult to simultaneously display an image being recorded and an image being reproduced. The display is also disrupted when displaying an OSD (on-screen display) superposed on an image.

Where the recording operation is synchronized with the reproducing operation, synchronization of an image and sound may not be fixed as a frame synchronizer is used. That is, when a video signal to be input and recorded on the disc becomes unstable, encoding is temporarily stopped and synchronization between encode processing of video data and encode processing of audio data cannot be realized. Therefore, the video data and audio data are shifted from each other at the time of recording.

In contrast, where the reproducing operation is synchronized with the recording operation, the reproducing operation may be influenced by the recording operation. That is, when the recording operation becomes unstable as a video signal to be input from outside and recorded on the disc is irregularly input, the reproducing operation becomes unstable, too, and the video signal cannot be reproduced stably.

Furthermore, in the recording/reproducing device having a function to record input data and simultaneously reproduce the data, if a recording system processing section and a reproducing system processing section are asynchronous, the time difference between recording data and reproducing data is not fixed, but may vary.

SUMMARY OF THE INVENTION

Thus, in view of the foregoing status of the art, it is an object of the present invention to provide a data recording/reproducing device which enables stable switching between output of data to be recorded and output of data to be reproduced, even in the case where independent synchronous systems are used for the recording operation and for the reproducing operation.

A data recording/reproducing device according to the present invention includes a video signal recording unit operable to record an input video signal onto a recording medium; a video recording synchronous controller operable to generate a video recording clock and to control the timing of recording processing carried out by the video signal recording unit in accordance with the video recording clock; an audio signal recording unit operable to record an input audio signal onto the recording medium; an audio recording synchronous controller operable to generate an audio recording clock and to control the timing of recording processing carried out by the audio signal recording unit in accordance with the audio recording clock; a video signal reproducing unit operable to reproduce a video signal recorded on the recording medium; a video reproduction synchronous controller operable to generate a video reproduction clock and to control the timing of reproducing processing carried out by the video signal reproducing unit in accordance with the video reproduction clock; an audio signal reproducing unit operable to reproduce an audio signal recorded on the recording medium; an audio reproduction synchronous controller operable to generate an audio reproduction clock and to control the timing of reproducing processing carried out by the audio signal reproducing unit in accordance with the audio reproduction clock; a storage device operable to store a recording video signal to be recorded onto the recording medium by the video signal recording unit; and an output controller operable to read out the recording video signal recorded in the storage device when switching and outputting a reproduction video signal to be reproduced by the video signal reproducing unit and the recording video signal to be recorded by the video signal recording unit.

A recording/reproducing device according to the present invention is adapted for recording and reproducing a video signal and an audio signal. The device includes an encoding circuit for encoding an input video signal and an input audio signal; a recording/reproducing circuit for recording the encoded video signal and the encoded audio signal onto a recording medium and for reproducing the recorded video signal and the recorded audio signal; a decoding circuit for decoding the reproduced video signal and the reproduced audio signal; a recording synchronous circuit for generating a recording clock for processing the encoded video signal and the encoded audio signal, and for controlling the timing of recording processing carried out by the recording/reproducing circuit on the basis of the recording clock; and a reproduction synchronous circuit for generating a reproduction clock for processing the reproduced video signal and the reproduced audio signal, and for controlling the timing of reproduction processing carried out by the recording/reproducing circuit on the basis of the reproduction clock; wherein the recording clock for processing the encoded audio signal by the recording synchronous circuit and the reproducing clock for processing the signal by the reproduction synchronous circuit are synchronized with each other.

A recording/reproducing device according to the present invention is adapted for recording and reproducing a video signal and an audio signal. The device includes an encoding circuit for encoding an input video signal and an input audio signal; a recording/reproducing circuit for recording the encoded video signal and the encoded audio signal onto a recording medium and for reproducing the recorded video signal and the recorded audio signal; a decoding circuit for decoding the reproduced video signal and the reproduced audio signal; a recording synchronous circuit for generating a recording clock for processing the encoded video signal and the encoded audio signal, and for controlling the timing of recording processing carried out by the recording/reproducing circuit on the basis of the recording clock; a reproduction synchronous circuit for generating a reproduction clock for processing the reproduced video signal and the reproduced audio signal, and for controlling the timing of reproduction processing carried out by the recording/reproducing circuit on the basis of the reproduction clock; a storage circuit for storing the input video signal; and a switching circuit for switching and outputting the stored video signal output in accordance with the reproduction clock and the reproduced video signal from the decoding circuit.

DESCRIPTION OF THE PREFERRED EMBODIMENTS

A preferred embodiment of the present invention will now be described in detail with reference to the drawings.

Figure 1:
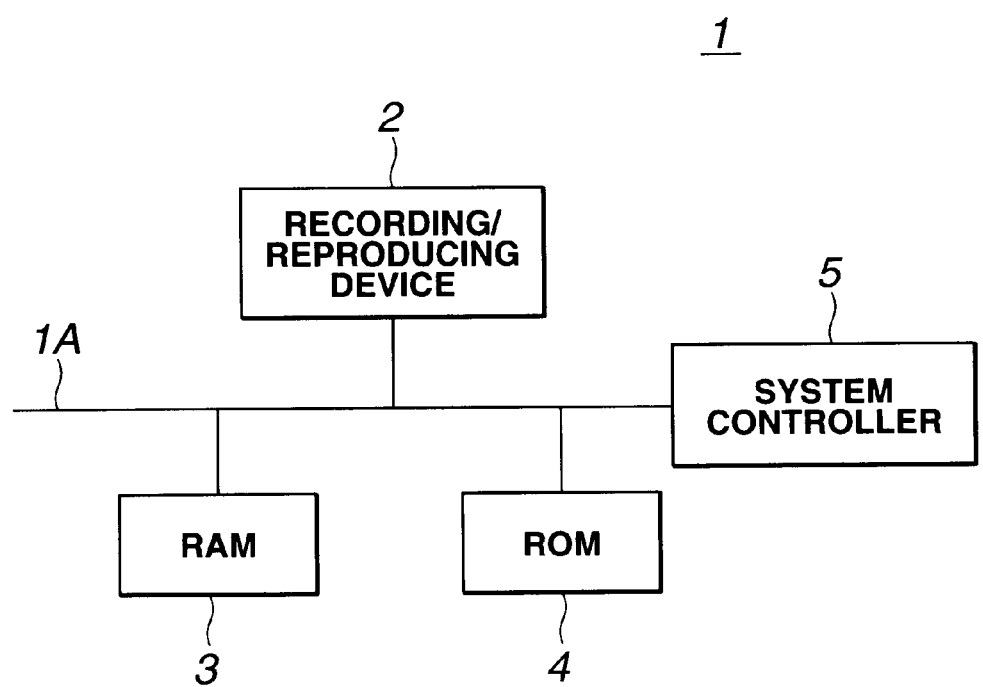
FIG. 1 is a block diagram showing the structure of a recording/reproducing system to which the present invention is applied.

The present invention is applied, for example, to a recording/reproducing system 1 having the structure shown in FIG. 1. The recording/reproducing system 1 includes a recording/reproducing device 2, a RAM (random access memory) 3, a ROM (read only memory) 4, and a system controller 5 which are connected on a host bus 1A. In the recording/reproducing system 1, as control signals are input by the system controller 5, the operation of the recording/reproducing device 2 is controlled. The system controller 5 accesses the RAM 3 and ROM 4 via the host bus 1A, if necessary, thus controlling the whole recording/reproducing system 1.

The recording operation of the recording/reproducing device 2 will be described first.

Figure 2:
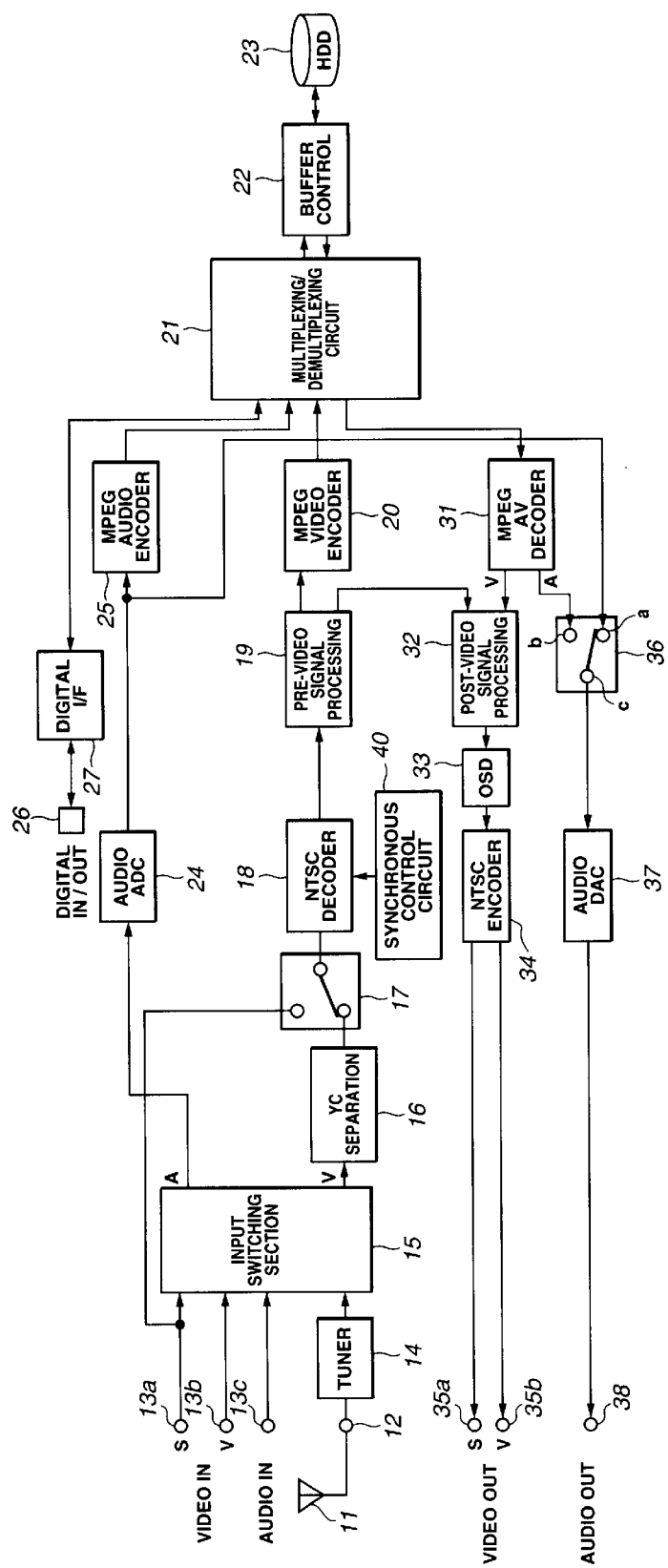
FIG. 2 is a block diagram showing the structure of a recording/reproducing device to which the present invention is applied.

The recording/reproducing device 2 has the structure shown in FIG. 2. The recording/reproducing device 2 is adapted to receive a video signal at a tuner 14 via an antenna terminal 12 connected to an antenna 11 or video signals input from analog input terminals 13a, 13b. The recording/reproducing device 2 records these video signals, as a transparent stream, on a recording medium within an HDD (hard disk drive) unit 23 via an input switching section 15, a YC separation circuit 16, a switch section 17, an NTSC (National Television System Committee) decoder 18, a pre-video signal processing circuit 19, an MPEG (Moving Picture Experts Group) video encoder 20, a multiplexing/demultiplexing circuit 21 and a buffer control circuit 22, all under the control of the system controller 5.

The recording/reproducing device 2 is also adapted to receive an audio signal at the tuner 14 via the antenna terminal 12 connected to the antenna 11 or an audio signal input from an analog input terminal 13c, and to record the audio signal as a transport stream on the recording medium within the HDD unit 23 via the input switching section 15, an audio A/D converter 24, an MPEG audio encoder 25, the multiplexing/demultiplexing circuit 21 and the buffer control circuit 22, again under the control of the system controller 5.

The antenna 11 may be, for example, a ground wave receiving antenna. The antenna 11 receives radio waves including a video signal and an audio signal which are superimposed, and outputs the received signal to the tuner 14.

The tuner 14 performs descrambling processing and demodulation processing on the signal received from the antenna 11, thus extracting the video signal and the audio signal, and outputs the video signal and the audio signal to the input switching section 15. An external S video signal input from the analog input terminal 13a, a composite video signal input from the analog input terminal 13b, and an audio signal input from the analog input terminal 13c are all output to the input switching section 15.

The input switching section 15 switches and outputs the video signals and the audio signal input thereto in accordance with a control signal from the system controller 5. The input switching section 15 outputs the video signals to the YC separation circuit 16 and outputs the audio signal to the audio A/D converter 24.

The YC separation circuit 16 performs YC separation processing using the composite video signal, thus generating a video signal made up of a luminance signal (Y) and a color-difference signal (C), and outputs the generated video signal to the switch section 17.

The switch section 17 is supplied with the video signal from the YC separation circuit 16 and the external S video signal input to the analog input terminal 13a. The switch section 17 outputs the external S video signal or the video signal from the YC separation circuit 16 to the NTSC decoder 18 in accordance with a control signal from the system controller 5.

The NTSC decoder 18 performs A/D conversion processing and chroma encode processing on the video signal from the switch section 17, thus converting the video signal to a digital component video signal (hereinafter referred to as video data), and outputs the video data to the pre-video signal processing circuit 19. The NTSC decoder 18 also outputs to a synchronous control circuit 40 a clock generated with reference to a horizontal synchronizing signal of the input video signal, and a horizontal synchronizing signal, a vertical synchronizing signal and a field identification signal obtained by synchronous separation.

The synchronous control circuit 40 generates a timing signal for outputting the signal from the NTSC decoder 18 to the pre-video signal processing circuit 19 on the basis of the horizontal synchronizing signal, the vertical synchronizing signal and the field identification signal from the NTSC decoder 18, and supplies the timing signal to the NTSC decoder 18. The structure of the synchronous control circuit 40 will be described later.

The pre-video signal processing circuit 19 performs various types of video data processing, such as pre-filtering of the video data from the NTSC decoder 18, and outputs the resultant video data to the MPEG video encoder 20 and a post-video signal processing circuit 32.

The MPEG video encoder 20 performs block DCT (discrete cosine transform) processing and MPEG coding processing, such as motion compensation processing, on the video data from the pre-video signal processing circuit 19, thus generating an elementary stream made up of the video data (hereinafter referred to as video ES), and outputs the video ES to the multiplexing/demultiplexing circuit 21. Although compression processing employing the MPEG system is carried out in this embodiment, other compression systems may also be employed or compression processing may be omitted.

Meanwhile, the audio A/D converter 24 supplied with the audio signal from the input switching section 15 performs A/D conversion processing on the input audio signal and outputs audio data to the MPEG audio encoder 25.

The MPEG audio encoder 25 compresses the audio data in accordance with the MPEG system, thus generating an elementary stream made up of the audio data (hereinafter referred to as audio ES), and outputs the audio ES to the multiplexing/demultiplexing circuit 21. Although compression processing employing the MPEG system is carried out in this embodiment, other compression systems may also be employed or compression processing may be omitted.

The multiplexing/demultiplexing circuit 21, at the time of data recording, performs multiplex processing using the video ES from the MPEG video encoder 20, the audio ES from the MPEG audio encoder 25, and various control signals, thus generating a transport stream, and outputs the transport stream to the buffer control circuit 22.

The buffer control circuit 22 carries out control to intermittently transmit the transport stream, which is continuously input from the multiplexing/demultiplexing circuit 21, to the HDD unit 23. When the HDD unit 23 is carrying out a seek operation, the buffer control circuit 22 cannot write the transport stream to the HDD unit 23, and therefore temporarily stores the transport stream in a built-in buffer. When writing becomes possible, the buffer control circuit 22 carries out writing at a higher rate than the input rate from the multiplexing/demultiplexing circuit 21, thus controlling the HDD unit 23 to continuously record the transport stream.

The HDD unit 23 has a recording medium therein, such as a magnetic disk, and records the transport stream at a predetermined address in accordance with a control signal from the system controller 5. As a data input/output protocol between the buffer control circuit 22 and the HDD unit 23, for example, IDE (Integrated Drive Electronics) may be used. Although the use of a magnetic disk is described in connection with this embodiment, the recording medium may be an optical disc, a magneto-optical disc, a solid-state memory or the like.

The reproducing operation of the recording/reproducing device 2 will now be described.

The recording/reproducing device 2 is adapted to decode a transport stream read out from the HDD unit 23 through the buffer control circuit 22, the multiplexing/demultiplexing circuit 21 and an MPEG AV (audio/video) decoder 31, thus preparing video data and audio data. The video data is output via the post-video signal processing circuit 32, an OSD (on-screen display) 33, an NTSC encoder 34 and video signal output terminals 35a, 35b so as to reproduce the video data. The audio data prepared by the MPEG AV decoder 31 is output to the host bus 1A via a switch section 36, an audio D/A converter 37 and an audio signal output terminal 38 so as to reproduce the audio data.

Upon receiving a control signal from the system controller 5 instructing that the data is to be reproduced, the HDD unit 23 seeks a predetermined address, reads out the transport stream from that address, and outputs the read-out transport stream to the buffer control circuit 22. The buffer control circuit 22 carries out buffer control so as to continuously output the transport stream, which it receives intermittently from the HDD unit 23, to the multiplexing/demultiplexing circuit 21.

The multiplexing/demultiplexing circuit 21 extracts a PES (packetized elementary stream) from the transport stream and outputs the extracted PES to the MPEG AV decoder 31.

The MPEG AV decoder 31 separates the input PES into a video ES and an audio ES and decodes the video ES and the audio ES. The MPEG AV decoder 31 then outputs the decoded video data to the post-video signal processing circuit 32 and outputs the decoded audio data to the switch section 36.

The post-video signal processing circuit 32 is supplied with the video data from the MPEG AV decoder 31 and the pre-video signal processing circuit 19. The post-video signal processing circuit 32 performs output switching, composition, and filter processing on the video data from the pre-video signal processing circuit 19 and the video data from the MPEG AV decoder 31 in accordance with a control signal from the system controller 5, and outputs the video data to the OSD 33.

The OSD 33 generates graphics for video display using the video data from the post-video signal processing circuit 32, and also performs display control processing for composite display and partial display of the video data. The OSD 33 then outputs the video data to the NTSC encoder 34.

The NTSC encoder 34 converts the video data from the OSD 33 to a luminance signal and a color-difference signal and then performs D/A conversion processing, thus obtaining a composite video signal and an S video signal in an analog format. The NTSC encoder 34 outputs the composite video signal to the video signal output terminal 35a and outputs the S video signal to the video signal output terminal 35b.

Meanwhile, the switch section 36 supplied with the audio data from the MPEG AV decoder 31 is also supplied with the audio signal from the MPEG audio encoder 25. The switch section 36 outputs either one of the audio data to the audio D/A converter 37 in accordance with a control signal from the system controller 5.

The audio D/A converter 37 performs D/A conversion processing on the audio data from the switch section 36, thus obtaining an audio signal, and outputs the audio signal from the audio signal output terminal 38.

The recording/reproducing device 2 is also adapted to receive video data and audio data input from a digital input/output terminal 26, and to record the video data and audio data, as a transport stream, on the recording medium within the HDD unit 23 via a digital I/F circuit 27, the multiplexing/demultiplexing circuit 21 and the buffer control circuit 22.

The digital input/output terminal 26 is connected, for example, with an external IRD (integrated receiver decoder) (not shown) and is supplied with video data and audio data from the external IRD via an IEEE (the Institute of Electrical and Electronics Engineers) 1394 digital interface. The digital input/output terminal 26 outputs the video data and audio data from the external IRD to the digital I/F circuit 27 and also outputs the video data and audio data from the digital I/F circuit 27 to the external IRD.

The digital I/F circuit 27 performs processing such as format conversion conformable to the interface connected with the digital input/output terminal 26, thus generating a transport stream, and outputs the generated transport stream to the multiplexing/demultiplexing circuit 21. The recording/reproducing device 2 records the transport stream, input from the digital I/F circuit 27 to the multiplexing/demultiplexing circuit 21, on the recording medium within the HDD unit 23 via the buffer control circuit 22 similarly to the above-described recording.

When reproducing data input via the digital input/output terminal 26, the HDD unit 23 reads out a transport stream from a predetermined address in accordance with a control signal from the system controller 5, and outputs the read-out transport stream to the digital I/F circuit 27 via the buffer control circuit 22 and the multiplexing/demultiplexing circuit 21.

The digital I/F circuit 27 performs processing such as format conversion for outputting to the digital input/output terminal 26 the data input from the multiplexing/demultiplexing circuit 21, and outputs the audio data and video data via the digital input/output terminal 26, thus reproducing the audio data and video data.

Figure 3:
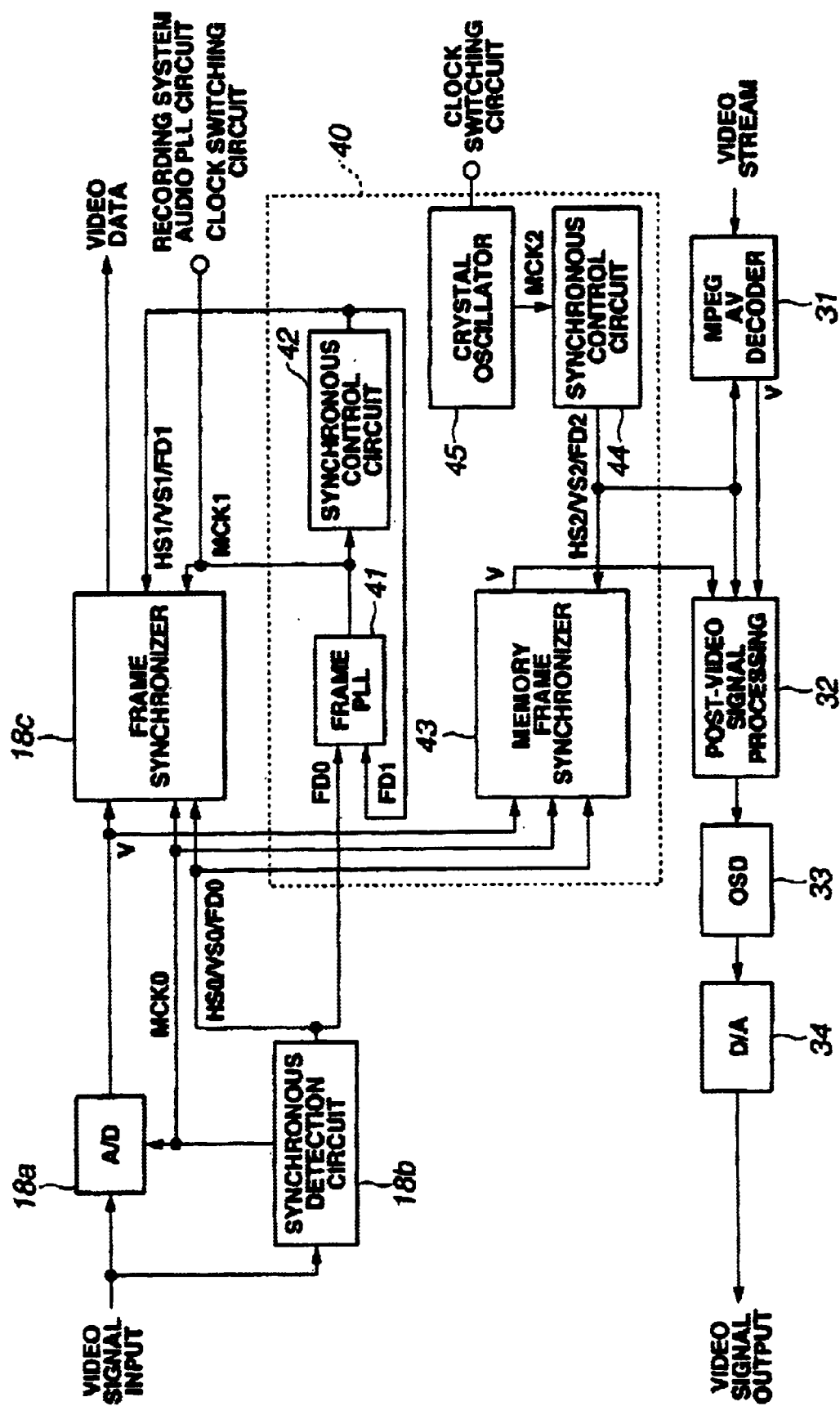
FIG. 3 is a block diagram showing the relation between a video signal recording system and a synchronous control circuit and the relation between the synchronous control circuit and a video signal reproducing system in the recording/reproducing device to which the present invention is applied.

The structure and operation of the synchronous control circuit 40 will now be described with reference to FIGS. 3 and 4.

The synchronous control circuit 40 is connected via switch section 17 to an A/D conversion processing section 18a, a synchronous detection circuit 18b and a frame synchronizer 18c, all provided inside the NTSC decoder 18. The synchronous control circuit 40 has a frame PLL (phase-locked loop) circuit 41 connected to the synchronous detection circuit 18b and to the frame synchronizer 18c, a recording system synchronous control circuit 42 connected to the frame PLL circuit 41 and the frame synchronizer 18c, a frame synchronizer 43 connected to the A/D conversion processing section 18a, a reproducing system synchronous control section 44 connected to the frame synchronizer 43, and a crystal oscillator 45 connected to the reproducing system synchronous control section 44.

The A/D conversion processing section 18a is supplied with a video signal from the switch section 17, then performs A/D conversion processing to provide video data, and outputs the video data to the frame synchronizer 18c and the frame synchronizer 43.

The synchronous detection circuit 18b is supplied with a video signal from the switch section 17, detects a horizontal synchronizing signal HS0, a vertical synchronizing signal VS0 and a field identification signal FD0 from the video signal, and outputs these signals to the frame synchronizer 18c and the frame synchronizer 43. The synchronous detection circuit 18b also detects from the video signal a sampling clock MCK0 for carrying out A/D conversion processing, and outputs the detected sampling clock MCK0 to the A/D conversion processing section 18a and the frame synchronizer 18c.

The frame synchronizer 18c includes a memory having a storage capacity of at least one frame and an input/output control circuit. As respective synchronizing signals corresponding to the horizontal and vertical synchronizing signals and the field identification signal of input/output signals and the clock signal are input, the frame synchronizer 18c can control the delay. The frame synchronizer 18c temporarily stores the video data from the A/D conversion processing section 18a. In this case, the frame synchronizer 18c writes the video data which is sampled with the sampling clock MCK0 from synchronous detection circuit 18b into the internal memory using the synchronizing signals (horizontal synchronizing signal HS0, vertical synchronizing signal VS0, field identification signal FD0) output from the synchronous detection circuit 18b. The frame synchronizer 18c also outputs the video data to the pre-video signal processing circuit 19 and the MPEG video encoder 20 in subsequent stages in accordance with the sampling clock MCK0 from the frame PLL circuit 41.

The frame PLL circuit 41 includes a phase comparator (not shown) and a VCO (voltage controlled oscillator) (not shown), and is supplied with the field identification signal FD0 from the synchronous detection circuit 18b and a field identification signal FD1 from the recording system synchronous control circuit 42. The frame PLL circuit 41 detects an error in phase between the field identification signal FD0 and the field identification signal FD1, and causes the VCO to generate a sampling clock MCK1 on the basis of the error signal. The frame PLL circuit 41 outputs the generated sampling clock MCK1 to the recording system synchronous control circuit 42 and the frame synchronizer 18c. Thus, the frame PLL circuit 41 changes the oscillation frequency.

The recording system synchronous control circuit 42 is a frame counter using the sampling clock MCK1 generated by the frame PLL circuit 41 as a clock, and generates a horizontal synchronizing signal HS1, a vertical synchronizing signal VS1 and a field identification signal FD1 using the sampling clock MCK1. The recording system synchronous control circuit 42 outputs these signals to the frame synchronizer 18c, and outputs the field identification signal FD1 to the frame PLL circuit 41.

The synchronous control circuit 40 carries out control so as to read out video data in the horizontal direction in accordance with the horizontal synchronizing signal HS1, video data in the vertical direction in accordance with the vertical synchronizing signal VS1, and video data of each frame stored in the memory of the frame synchronizer 18c in accordance with the sampling clock MCK1, and outputs the read-out video data to the pre-video signal processing circuit 19 and the MPEG video encoder 20 in subsequent stages.

The recording/reproducing device 2 also has a reproducing system for outputting an input video signal via the A/D conversion processing section 18a, the frame synchronizer 43 of the synchronous control circuit 40, the post-video signal processing circuit 32, the OSD 33, the NTSC encoder 34, and the video signal output terminal 35.

The frame synchronizer 43 temporarily stores the video data from the A/D conversion processing section 18a in its built-in memory. In this case, the frame synchronizer 43 writes the video data into the built-in memory in accordance with the sampling clock MCK0, the vertical synchronizing signal VS0, the horizontal synchronizing signal HS0 and the field identification signal FD0.

The reproducing system synchronous control circuit 44 is made up of a frame counter using an oscillation signal generated by the crystal oscillator 45 as a clock, and generates a master clock for synchronization of the reproducing system in accordance with an oscillation signal MCK2 from the crystal oscillator 45. Specifically, the reproducing system synchronous control circuit 44 generates a horizontal synchronizing signal HS2 for controlling reading in the horizontal direction, a vertical synchronizing signal VS2 for controlling reading in the vertical direction, and a field identification signal FD2 for field identification, and supplies these signals to the frame synchronizer 43, the MPEG AV decoder 31 and the post-video signal processing circuit 32.

The frame synchronizer 43 reads out the video data, input from the A/D conversion processing section 18a and stored in the built-in memory, in accordance with the horizontal synchronizing signal HS2, the vertical synchronizing signal VS2, and the field identification signal FD2, and supplies the read-out video data to the post-video signal processing circuit 32. The video data input from the frame synchronizer 43 to the post-video signal processing circuit 32 is processed by superimposition of images like PinP (picture in picture) and then output via the OSD 33, the NTSC encoder 34 and the video signal output terminal 35.

When decoding the video stream from the multiplexing/demultiplexing circuit 21, the MPEG AV decoder 31 reads out the video data in accordance with the horizontal synchronizing signal HS2, the vertical synchronizing signal VS2, and the field identification signal FD2 from the reproducing system synchronous control circuit 44, and outputs the decoded video stream to the post-video signal processing circuit 32.

In the recording/reproducing device 2 thus constituted, when a video signal input from the analog input terminal 13 or the antenna terminal 12 is output from video signal output terminal 35, it is possible to temporarily store the video data in the frame synchronizer 43, then read out the video data from the frame synchronizer 43 in accordance with the synchronizing signals (HS2, VS2, FD2) from the reproducing system synchronous control circuit 44. The read-out video data may be output from the video signal output terminal 35 via the post-video signal processing circuit 32 and the like. Therefore, since video data generated in the recording system is output in accordance with the synchronizing signals (horizontal synchronizing signal HS2, vertical synchronizing signal VS2, field identification signal FD2) of the reproducing system, deviation from synchronization does not occur, even when the output is switched between the image being recorded and the image being reproduced.

Thus, in the recording/reproducing device 2, since the sampling clock MCK1 is used when recording an input video signal in the HDD unit 23 and the sampling clock MCK2 is used when reproducing the video signal recorded in the HDD unit 23, recording and reproduction can be carried out with independent clocks. Also, when outputting a video signal to be recorded, the video signal is temporarily stored in the frame synchronizer 43 and then read out in accordance with the sampling clock MCK2. Therefore, output switching between the image being recorded and the image being reproduced can be seamlessly carried out and stable display of the OSD is made possible.

Moreover, in the recording/reproducing device 2, stable processing can be carried out, for example, even where a video signal of only one field exists as a video signal to be input for recording from the analog input terminal 13 or the antenna 11, or where the temporal length of a frame varies, as in varying-speed reproduction by a VCR (video cassette recorder), or where a frame is made discontinuous by switching the channel of the input signal.

The structure of the synchronous control circuit 40 for outputting from the audio signal output terminal 38 an audio signal input from the analog input terminal 13c or the antenna 11 will now be described with reference to FIG. 4.

The audio signal input from the analog input terminal 13c or the antenna 11 is input to the audio A/D converter 24 via the input switching section 15. The audio signal is converted to digital audio data by the audio A/D converter 24. Encode processing is performed on the audio data by the MPEG audio encoder 25 and the audio data is output from the audio signal output terminal 38 via the switch section 36 and the audio D/A converter 37.

Figure 4:
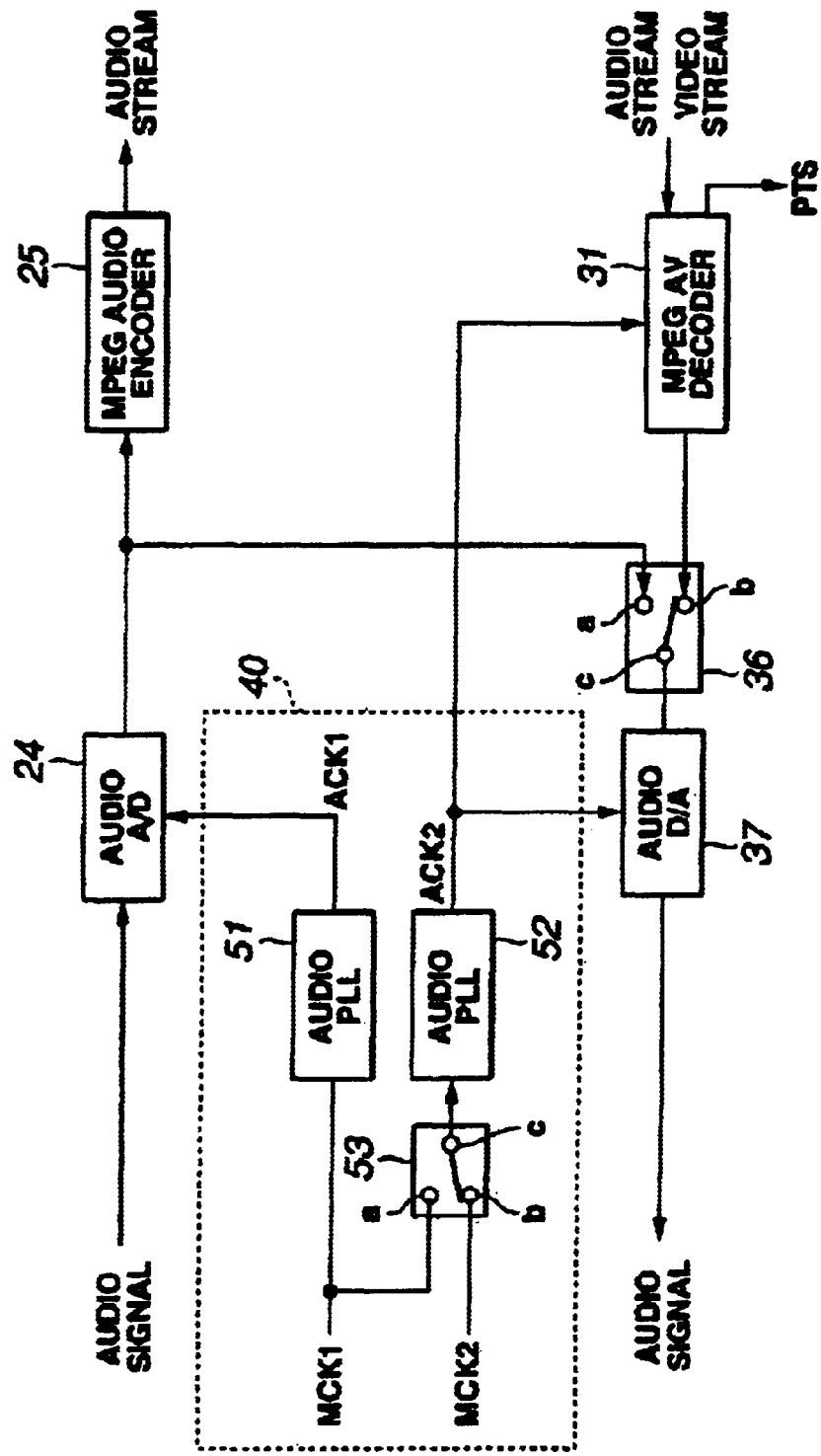
FIG. 4 is a block diagram showing the relation between an audio signal recording system and a synchronous control circuit and the relation between the synchronous control circuit and an audio signal reproducing system in the recording/reproducing device to which the present invention is applied.

The synchronous control circuit 40 has a recording system audio PLL circuit 51 connected to the audio A/D converter 24, a reproducing system audio PLL circuit 52 connected to the MPEG AV decoder 31 and the audio D/A converter 37, and a clock switching circuit 53 connected to the reproducing system audio PLL circuit 52, as shown in FIG. 4.

The recording system audio PLL circuit 51 is connected to the above-described frame PLL circuit 41 and is supplied with the sampling clock MCK1 the frame PLL circuit 41 generates. The recording system audio PLL circuit 51 refers to the sampling clock MCK1 and generates a sampling clock ACK1 for A/D conversion processing carried out by the audio A/D converter 24. That is, the recording system audio PLL circuit 51 generates the sampling clock ACK1 with reference to the clock for sampling the video data. This is because locking must be carried out by the PLL so as to realize synchronization between the video data and the audio data to be recorded.

The audio A/D converter 24 performs A/D conversion on each frame of the audio data in accordance with the sampling clock ACK1 and outputs the resultant audio data to the MPEG audio encoder 25.

The clock switching circuit 53 is connected to the frame PLL circuit 41 and the crystal oscillator 45, and is supplied with the sampling clock MCK1 generated by the frame PLL circuit 41 and the sampling clock MCK2 generated by the crystal oscillator 45. The clock switching circuit 53 outputs either one of the MCK sampling clocks to the reproducing system audio PLL circuit 52 in accordance with a control signal from the system controller 5.

The reproducing system audio PLL circuit 52 is connected to the MPEG AV decoder 31 and the audio D/A converter 37 and generates a sampling clock ACK2 by using the sampling clock MCK1 or the sampling clock MCK2, depending on the switching output of the clock switching circuit 53. The reproducing system audio PLL circuit 52 outputs the sampling clock ACK2 thus generated.

In the recording/reproducing device 2 having the synchronous control circuit 40 thus constituted, when reproducing the audio data recorded in the HDD unit 23 and outputting the audio data from the audio signal output terminal 38, a terminal b and a terminal c of the clock switching circuit 53 are connected with each other and a terminal b and a terminal c of the switch section 36 are connected with each other in accordance with a control signal from the system controller 5. In such a state, the sampling clock MCK2 generated by the crystal oscillator 45 is input to the reproducing system audio PLL circuit 52. The reproducing system audio PLL circuit 52 generates the sampling clock ACK2 by using the sampling clock MCK2 and outputs the sampling clock ACK2 to the MPEG AV decoder 31 and the audio D/A converter 37. The MPEG AV decoder 31 performs decode processing in accordance with the sampling clock ACK2 and outputs the resultant audio data to the audio D/A converter 37 via the switch section 36. The audio D/A converter 37 performs D/A conversion processing in accordance with the sampling clock ACK2 and outputs the resultant audio signal to the audio signal output terminal 38.

Thus, in the recording/reproducing device 2, decode processing of the audio data and video data by the MPEG AV decoder 31 and reproduction of the audio data and video data can be carried out in accordance with the sampling clock MCK2 generated by the crystal oscillator 45, and the audio signal and the video signal can be output synchronously.

Also, in the recording/reproducing device 2, when outputting from the audio signal output terminal 38 an audio signal input from the analog input terminal 13c or the antenna 11, the terminal a and the terminal c of the clock switching circuit 53 are connected with each other and the terminal a and the terminal c of the switch section 36 are connected with each other in accordance with a control signal from the system controller 5. In such a state, the sampling clock MCK1 generated by the frame PLL circuit 41 is input to the reproducing system audio PLL circuit 52. The reproducing system audio PLL circuit 52 generates the sampling clock ACK2 by using the sampling clock MCK1 and outputs the sampling clock ACK2 to the MPEG AV decoder 31 and the audio D/A converter 37. The audio D/A converter 37 performs D/A conversion processing in accordance with the sampling clock ACK2 and outputs the resultant audio signal to the audio signal output terminal 38.

The following will describe the operation of the recording/reproducing system 1 in the case of carrying out follow-up reproduction in which a video signal and an audio signal input from the analog input terminal 13c or the antenna 11 are recorded in the HDD unit 23 and are reproduced immediately after recording.

In accordance with the input of a control signal instructing that follow-up reproduction is to be carried out, the recording/reproducing device 2 causes the terminal b and the terminal c of the switch section 36 to be connected with each other and causes the terminal a and the terminal c of the clock switching circuit 53 to be connected with each other. Then, the recording/reproducing device 2 causes the sampling clock ACK2 to be locked with the sampling clock MCK1.

The system controller 5 has an STC (system time clock) which is counted by the sampling clock MCK2 for reproduction at the time of normal reproduction, and loads into the STC a value of an SCR (system clock reference) added to a stream in accordance with the MPEG system, thus setting the time. The SCR includes a DTS (decode time stamp) indicating the timing of decoding and a PTS (presentation time stamp) indicating the timing of output or display. The system controller 5 carries out control so as to decode the video data and audio data of the time indicated by the DTS with reference to the SCR and to output the video signal or audio signal of the time indicated by the PTS from the video signal output terminal 35 or the audio signal output terminal 38.

In the recording/reproducing system 1 thus constituted, when carrying out follow-up reproduction, the PTS of the audio stream input to the MPEG AV decoder 31 is loaded into the STC of the system controller 5 and the timing of decoding of the video stream is controlled in accordance with the STC, thus carrying out synchronization employing an audio master system in which the video stream is decoded in accordance with the audio stream.

Specifically, in the recording/reproducing system 1, decode processing and output processing are continuously carried out on the audio stream synchronously with the sampling clock ACK2, and the PTS detected at the time of decoding is loaded every time into the counter of the STC in the system controller 5. Then, the system controller 5 controls the recording/reproducing device 2 to compare the time of the STC with the time of the PTS of the video stream and to carry out output processing when these times are coincident with one another.

In the recording/reproducing system 1 which carries out the above-described processing, the sampling clock ACK2 is generated on the basis of the sampling clock MCK1, and the sampling clock ACK2 as the reference for reproducing audio data and the sampling clock MCK2 as the reference for reproducing video data are asynchronous. Therefore, where the sampling clock MCK2 is relatively faster than the sampling clock ACK2 when the above-described processing is carried out, the output rate of the video data is higher than the output rate of the audio data. In such a case, the audio data supplied from the MPEG AV decoder 31 to the switch section 36 is less than the video data supplied from the multiplexing/demultiplexing circuit 21 to the MPEG AV decoder 31 and an overflow may be generated with respect to the video data.

In such a case, the overflow of video data is corrected by outputting a control signal from the system controller 5 to the MPEG AV decoder 31 so as to skip an arbitrary frame, thus delaying the video output based on the sampling clock MCK2 by a frame.

On the other hand, where the sampling clock MCK2 is relatively slower than the sampling clock ACK2, the audio stream supplied from the multiplexing/demultiplexing circuit 21 to the MPEG AV decoder 31 is excessive and an overflow may be generated with respect to the audio data.

In such a case, the underflow of video data is corrected by outputting a control signal from the system controller 5 to the MPEG AV decoder 31 so as to carry out processing to repeatedly output video data indicating an arbitrary frame to the post-video signal processing circuit 32, thus advancing the video output based on the sampling clock MCK2 by a frame.

With the recording/reproducing system 1 which carries out the above-described processing, video data can be decoded and output synchronously with the sampling clock ACK2 indicating the decoding timing for outputting an audio signal.

With the recording/reproducing system 1, the reproducing system as a whole carries out processing synchronized with the sampling clock MCK1, and synchronization between the recording operation and the reproducing operation can be maintained. Also, the clock for video data need not be varied between recording and reproduction and synchronization with audio data can be realized.

Thus, with the recording/reproducing system 1, even in the case of carrying out follow-up reproduction, synchronization between the recording operation and the reproducing operation can be realized by synchronizing audio data with the sampling clock ACK2 while holding an asynchronous relation between the recording operation and the reproducing operation.

As described above in detail, since the data recording/reproducing device according to the present invention has an output control for reading out a recording video signal stored in a storage device in accordance with a video reproduction clock when switching and outputting a reproduction video signal to be reproduced by video signal reproducing means and a recording video signal to be recorded by video signal recording means, the reproduction video signal and the recording video signal can be output synchronously. Therefore, even in the case where independent synchronous control means are used for the recording operation and for the reproducing operation, switching between the output of data to be recorded and the output of data to be reproduced can be carried out stably.

What is claimed is:

1. A recording/reproducing device, comprising:

a video signal recording unit operable to record an input video signal onto a recording medium;

a video recording synchronous controller operable to generate a video recording clock and to control a timing of recording processing carried out by said video signal recording unit in accordance with the video recording clock;

an audio signal recording unit operable to record an input audio signal onto the recording medium;

an audio recording synchronous controller operable to generate an audio recording clock and to control a timing of recording processing carried out by said audio signal recording unit in accordance with the audio recording clock;

a video signal reproducing unit operable to reproduce the recorded input video signal from the recording medium to provide a reproduction video signal;

a video reproduction synchronous controller operable to generate a video reproduction clock and to control a timing of reproducing processing carried out by said video signal reproducing unit in accordance with the video reproduction clock;

an audio signal reproducing unit operable to reproduce the recorded input audio signal to provide a reproduction audio signal;

an audio reproduction synchronous controller operable to generate an audio reproduction clock and to control a timing of reproducing processing carried out by said audio signal reproducing unit in accordance with the audio reproduction clock;

a storage device operable to store the input video signal to be recorded onto the recording medium by said video signal recording unit; and a video processing controller operable to provide an output video signal from the reproduction video signal and to switch between outputting, in accordance with the video reproduction clock, the input video signal to be recorded, which is stored in said storage device, and the reproduction video signal.

2. The recording/reproducing device as claimed in claim 1, wherein said video processing controller synchronizes and simultaneously outputs the reproduction video signal and the stored input video signal in accordance with the video reproduction clock.

3. The recording/reproducing device as claimed in claim 1, wherein, when outputting the input audio signal to be recorded onto the recording medium by said audio signal recording unit, said audio reproduction synchronous controller is operable to generate the audio reproduction clock on the basis of the video recording clock and to control the timing of reproducing processing carried out by said audio signal reproducing unit in accordance with the audio reproduction clock; and when outputting the reproduction audio signal, said audio reproduction synchronous controller is operable to generate the audio reproduction clock on the basis of the video reproduction clock and to control the timing of reproducing processing carried out by said audio signal reproducing unit in accordance with the audio reproduction clock.

4. A recording/reproducing device as claimed in claim 1, wherein said video processing controller is operable to output the stored input video signal from said storage device and the reproduction video signal in accordance with each of a horizontal sync, vertical sync and field identification signal generated in accordance with the video reproduction clock.

5. A recording/reproducing device as claimed in claim 4, wherein the horizontal sync, vertical sync and field identification signals are National Television System Committee (NTSC) format signals.

6. A recording/reproducing device as claimed in claim 4, wherein said storage device is operable to digitally store samples of the input video signal obtained in accordance with each of a horizontal sync, vertical sync and field identification signal synchronized to the video recording clock.

7. A recording/reproducing device for recording and reproducing a video signal and an audio signal, comprising:

an encoding circuit for encoding an input video signal and an input audio signal to provide an encoded video signal and an encoded audio signal;

a recording/reproducing circuit for recording the encoded video signal and the encoded audio signal onto a recording medium and for reproducing the recorded encoded video signal and the recorded encoded audio signal to provide a reproduced encoded video signal and a reproduced encoded audio signal;

a decoding circuit for decoding the reproduced encoded video signal and the reproduced encoded audio signal to provide a reproduced video signal and a reproduced audio signal;

a recording synchronous circuit for generating a recording clock for processing the encoded video signal and the encoded audio signal, and for controlling a timing of recording processing carried out by said recording/reproducing circuit on the basis of the recording clock;

a reproduction synchronous circuit for generating a reproduction clock for processing the reproduced video signal and the reproduced audio signal, and for controlling a timing of reproduction processing carried out by the recording/reproducing circuit on the basis of the reproduction clock;

a storage circuit for storing the input video signal to be encoded and recorded; and a switching circuit for outputting, in accordance with the reproduction clock, the stored input video signal from said storage circuit, and the reproduced video signal.

8. The recording/reproducing device as claimed in claim 7, wherein the input video signal and the input audio signal are recorded and reproduced time-divisionally.

9. A recording/reproducing device as claimed in claim 7, wherein said switching circuit is operable to output the stored input video signal from said storage circuit and the reproduced video signal in accordance with each of a horizontal sync, vertical sync and field identification signal generated in accordance with the reproduction clock.

10. A recording/reproducing device as claimed in claim 9, wherein the horizontal sync, vertical sync and field identification signals are National Television System Committee (NTSC) format signals.

11. A recording/reproducing device as claimed in claim 9, wherein said storage circuit is operable to digitally store samples of the input video signal obtained in accordance with each of a horizontal sync, vertical sync and field identification signal synchronized to the recording clock.

12. A recording/reproducing method, comprising:

inputting a video signal;

generating a video recording clock and recording the input video signal onto a recording medium in accordance with the video recording clock;

generating a video reproduction clock;

temporarily storing in a storage device the input video signal to be recorded onto the recording medium;

reading the stored input video signal from the storage device; and outputting, in accordance with the video reproduction clock, an output video signal by switching between a reproduction video signal from the recording medium and the input video signal stored in the storage device.

13. A recording/reproducing method as claimed in claim 12, wherein the reproduction video signal and the input video signal are output in accordance with each of a horizontal sync, vertical sync and field identification signal generated in accordance with the video reproduction clock.

14. A recording/reproducing method as claimed in claim 13, wherein the horizontal sync, vertical sync and field identification signals are National Television System Committee (NTSC) format signals.

15. A recording/reproducing method as claimed in claim 13, wherein the input video signal is stored in accordance with each of a horizontal sync, vertical sync and field identification signal synchronized to the video recording clock.

* * * * *